US012798107B2

(12) United States Patent
Shuo et al.

(10) Patent No.: US 12,798,107 B2
(45) **Date of Patent: *Nov. 17, 2026**

(54) SYSTEM AND METHOD FOR TEACHING A ROBOT TO MIMIC PRECISE HUMAN MOTIONS FOR CREATION OF COFFEE

(71) Applicant: Blue Hill Tech, Inc., Seattle, WA (US)

(72) Inventors: Liu Shuo, Kirkland, OR (US); Xuchu Ding, Seattle, WA (US); Meng Wang, Seattle, WA (US); Yushan Chen, Seattle, WA (US); Wenbo Yang, Beaverton, OR (US)

(73) Assignee: Blue Hill Tech, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/250,965

(22) Filed: Jun. 26, 2025

(65) Prior Publication Data

US 2025/0319605 A1 Oct. 16, 2025

Related U.S. Application Data

(63) Continuation of application No. 18/273,912, filed as application No. PCT/US2021/033727 on May 21, 2021, now Pat. No. 12,466,077.

(60) Provisional application No. 63/028,109, filed on May 21, 2020.

(51) Int. Cl.

| | |
|---|---|
| ***B25J 9/16*** | (2006.01) |
| ***A47J 31/52*** | (2006.01) |
| ***B25J 9/00*** | (2006.01) |
| ***B25J 11/00*** | (2006.01) |
| ***B25J 19/02*** | (2006.01) |
| ***G06T 7/20*** | (2017.01) |
| ***G06T 7/70*** | (2017.01) |

(52) U.S. Cl.

CPC ............. *B25J 9/1697* (2013.01); *A47J 31/52* (2013.01); *B25J 9/0081* (2013.01); *B25J 9/1669* (2013.01); *B25J 11/008* (2013.01); *B25J 19/023* (2013.01); *G06T 7/20* (2013.01); *G06T 7/70* (2017.01); *G06T 2207/10016* (2013.01); *G06T 2207/20081* (2013.01); *G06T 2207/30241* (2013.01)

(58) Field of Classification Search

CPC ...... B25J 9/1697; B25J 9/0081; B25J 9/1669; B25J 11/008; B25J 19/023; A47J 31/52; A47J 31/00; G06T 7/20; G06T 7/70; G06T 2207/10016; G06T 2207/20081; G06T 2207/30241

See application file for complete search history.

(56) References Cited

U.S. PATENT DOCUMENTS

| | | | | |
|---|---|---|---|---|
| 8,447,863 | B1 * | 5/2013 | Francis, Jr. ......... | G06F 16/2468 709/227 |
| 8,843,236 | B2 * | 9/2014 | Barajas .................. | B25J 9/1664 901/5 |
| 9,014,857 | B2 * | 4/2015 | Ota ........................ | B25J 9/1669 700/262 |
| 10,025,984 | B2 * | 7/2018 | Rajkumar ............. | G06V 20/10 |

(Continued)

*Primary Examiner* — Sohana Tanju Khayer

(74) *Attorney, Agent, or Firm* — White and Williams LLP

(57) ABSTRACT

A method for recording human motion performing a task with a tool and training a robot to perform the task, including the steps of performing tracker calibration without the robot present, performing teaching tool calibration with the robot present and placed at a predetermined location, and performing training without the robot present.

4 Claims, 8 Drawing Sheets

(56) References Cited

U.S. PATENT DOCUMENTS

| | | | | | |
|---|---|---|---|---|---|
| 10,131,051 | B1 * | 11/2018 | Goyal | B25J 9/1697 |
| 2017/0348854 | A1 * | 12/2017 | Oleynik | A47J 47/02 |
| 2018/0333859 | A1 * | 11/2018 | Ban | B25J 19/023 |
| 2019/0291277 | A1 * | 9/2019 | Oleynik | B25J 9/1669 |
| 2020/0316780 | A1 * | 10/2020 | Rostrup | B25J 9/1692 |
| 2021/0252713 | A1 * | 8/2021 | Mimura | G06F 3/04883 |
| 2022/0257263 | A1 * | 8/2022 | Chappuis | A61B 34/74 |
| 2023/0031545 | A1 * | 2/2023 | Oleynik | B25J 11/009 |
| 2023/0240761 | A1 * | 8/2023 | Bonny | A61B 34/20<br>73/1.79 |

* cited by examiner

P1: Tracker Calibration Process

SYSTEM AND METHOD FOR TEACHING A ROBOT TO MIMIC PRECISE HUMAN MOTIONS FOR CREATION OF COFFEE

CROSS-REFERENCE TO RELATED APPLICATIONS

The present application is a continuation of U.S. patent application Ser. No. 18/273,912, filed Jul. 24, 2023, which is a United States National Stage (§ 371) application of PCT/US21/33727 filed May 21, 2021, which claims the benefit of U.S. Provisional Patent Application Ser. No. 63/028,109, filed on May 21, 2020, the contents of which are hereby incorporated by reference in their entirety.

FIELD OF THE INVENTION

The present invention relates to the field of teaching robots to mimic human motions through a system that can capture and track detailed human motion carrying out a task and precisely and accurately play back the exact motion on robot arm manipulators.

BACKGROUND

Traditional methods to teach robots to achieve certain tasks involve guiding or teleoperating the robot, and programming the robot to repeat the exact motion. Recently, there has been progress in a method called Programming by Demonstration, or Imitation Learning, described in Billard, A., Calinon, S., Dillmann, R., & Schaal, S. (2008). Survey: Robot programming by demonstration, *Handbook of robotics,* 59, that is capable of teaching a robot how to perform a task by repeated demonstrations, generalizing the motion and reproducing the motion on the robot. This method is appealing because it allows the robot to perform the task without requiring it to start at the exact initial conditions and the motion can be reproduced in different situations and contexts. For example, a picking task can be taught to the robot so that it can be used to pick up items of different sizes and shapes. However, Imitation Learning has difficulty teaching detailed human motion required to perform intricate tasks, such as working with a portafilter with a specialty coffee machine, or pouring milk from a milk pitcher to a cup of coffee to create latte art.

BRIEF SUMMARY

The present disclosure is directed to a modular robotic coffee barista station that is configured to prepare espresso drinks, cold brew, iced coffee, and drip coffee using commercial coffee equipment. The present disclosure also focuses on capturing precise human motion in order to aid a robot to complete food and beverage making tasks.

In accordance with another aspect of the present disclosure, a robotic coffee preparation and serving station is provided that includes a six-axis robot arm controlled by executable software on a processor, robot end-effector that can be controlled by the processor and a motion capture system that can capture motion with respect to a tool (such as a milk pitcher) with a high precision.

In accordance with another aspect of the present disclosure, a method of guiding a robot with an end-effector to perform an exact motion with a tool (such as a milk pitcher) according to precisely captured human motion is provided.

In accordance with another aspect of the foregoing disclosure, a robotic coffee preparation and serving station is provided that includes a six-axis robot arm controlled by executable software on a processor, robot end-effector that can be controlled by the processor, a motion capture system that can capture motion with respect to a tool (such as a milk pitcher) with a high precision, and some additional hardware (such as a tilting platform to hold a cup) that can be controlled by the processor.

In accordance with another aspect of the present disclosure, a method of guiding a robot with an end-effector to perform an exact motion with a tool (such as a milk pitcher) according to precisely captured human motion which is synchronized with some additional hardware (such as a tilting platform to hold a cup) is provided.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

This invention describes a system that allows one to capture complex and intricate human motions, such that captured human motion can be reproduced by a robotic manipulator arm precisely and accurately. The system may include two major steps, calibration shown in FIGS. 1 and 2, and learning from human demonstration as shown in FIG. 3. To further understand the capability of the system, it may be helpful to understand that complex and intricate human motion are motion that fluctuates and varies in a high rate, e.g., pouring frothed milk into a cup forming a latte art, or installing a portafilter on an espresso machine. It may be further helpful to understand that motion captured by the system is to be reproduced in a precise and accurate manner. Precise means that the difference in motion reproduced and the actual motion must be small enough to be negligible.

Figure 1:
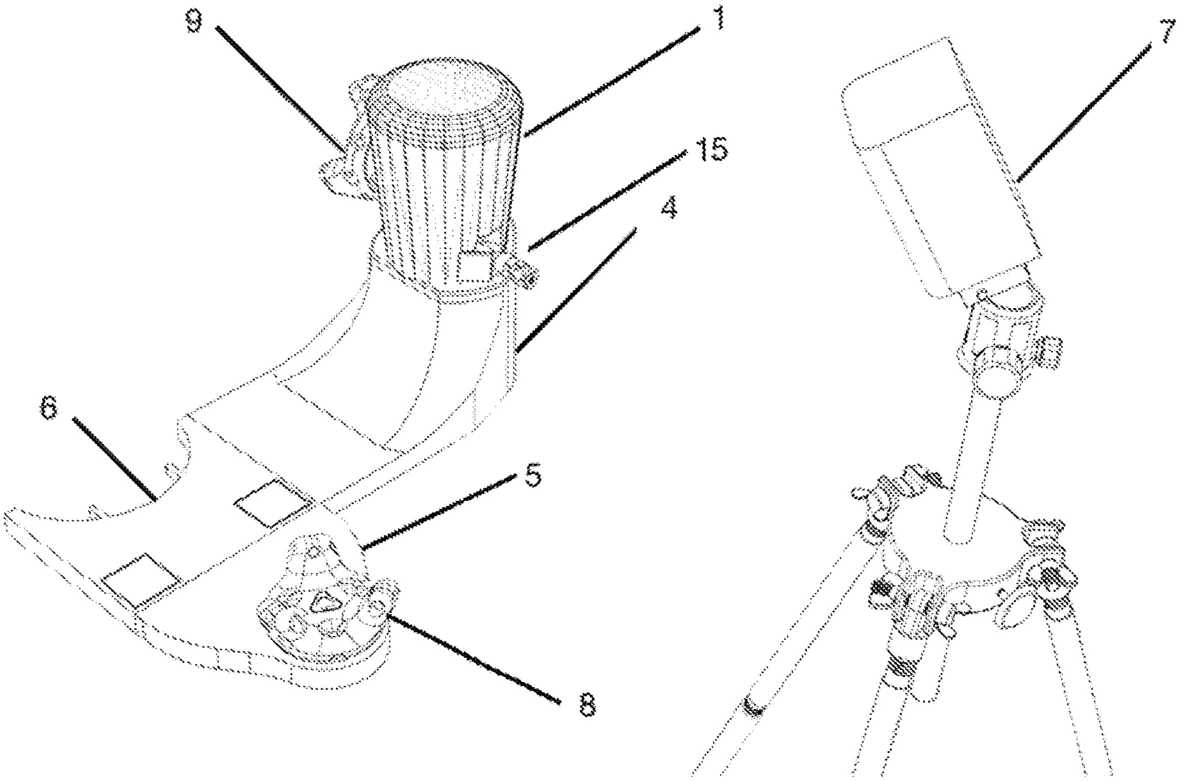
FIG. 1 is a schematic diagram of the calibration process for the tracking device 9 according to an aspect of the present disclosure.
Figure 2:
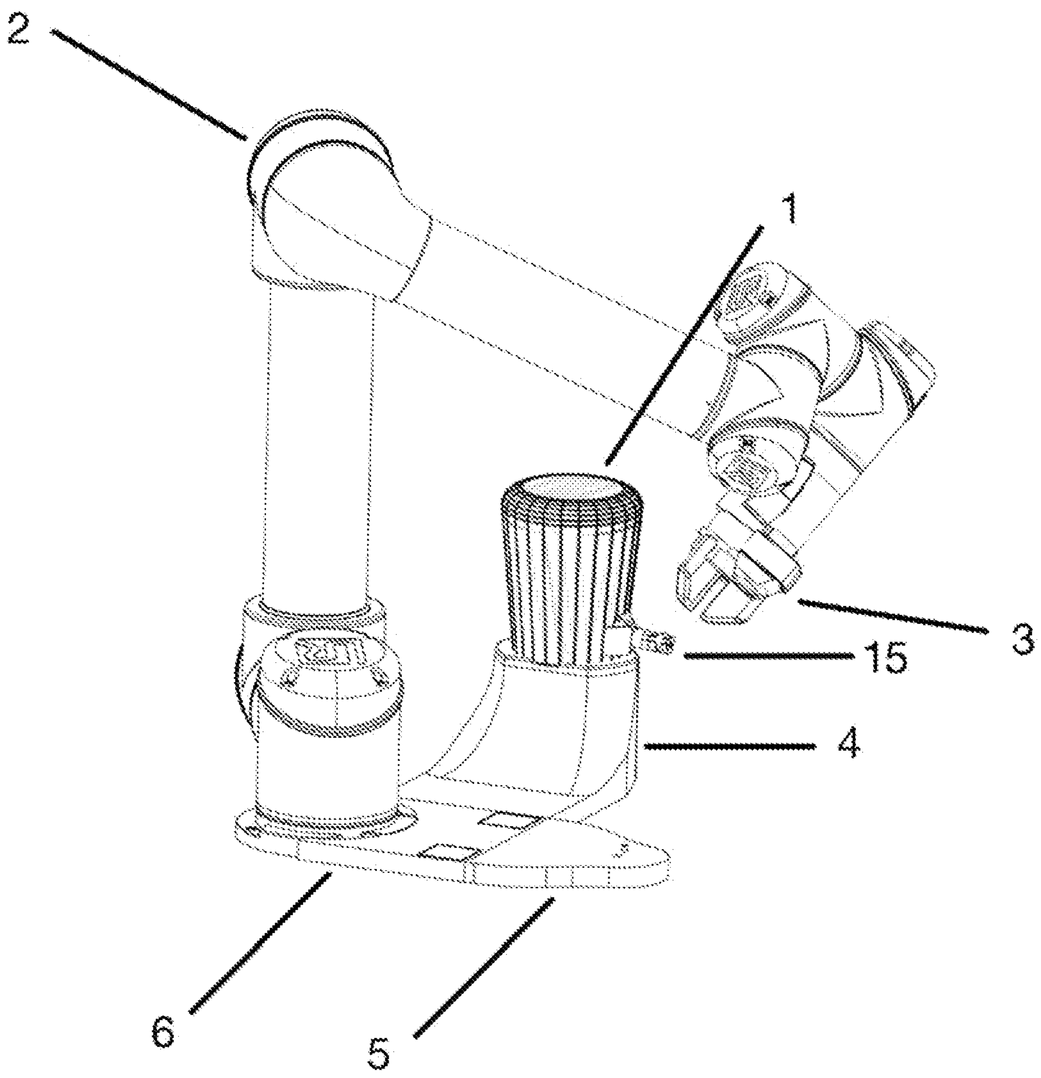
FIG. 2 is a schematic diagram of the calibration process for the teaching tool 1 according to an aspect of the present disclosure.
Figure 3:
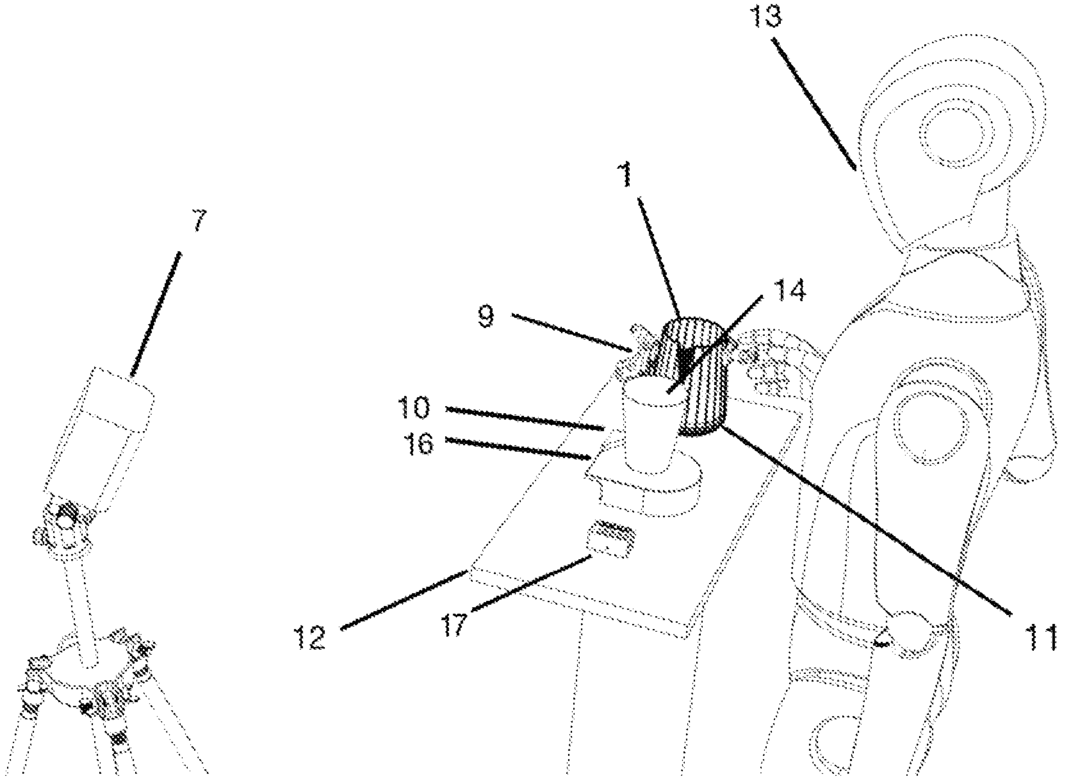
FIG. 3 is a schematic diagram of the learning from human demonstration process according to an aspect of the present disclosure.

As shown in FIGS. 1-3, human motions may be captured when using a tool, e.g., teaching tool 1, graspable by human 13, or an end-effector 3 of a robotic arm 2. For example, as shown in FIG. 3, when pouring latte art, the teaching tool 1 may be a milk pitcher. In another example, when drawing a painting, the teaching tool may be a brush. The system described by this invention includes a method to automatically and precisely measure the orientation and positional offset between the robot end-effector 3 and the teaching tool 1.

The system includes motion capture devices and a robotic manipulator arm 2 capable of executing a trajectory of joint angle movements. Motion capture receiver 7 captures signals from motion tracking devices 8 and 9 and records motion trajectories in the motion capture coordinate system. Various motion capturing systems may be used including, but not limited to VICON, HTC VIVE, MOCAP, and OptiTrack. The motion capturing system must be able to provide sufficient accuracy (typically below 1 millimeter). This invention also may be used with various robotic arms. The robotic arm should be able to repeat motions with sufficient accuracy (typically below 1 millimeter). The robot should have encoders in, on or near its joints so that joint angles of its current state can be measured with sufficient accuracy (typically below 1 degree).

Figure 8:
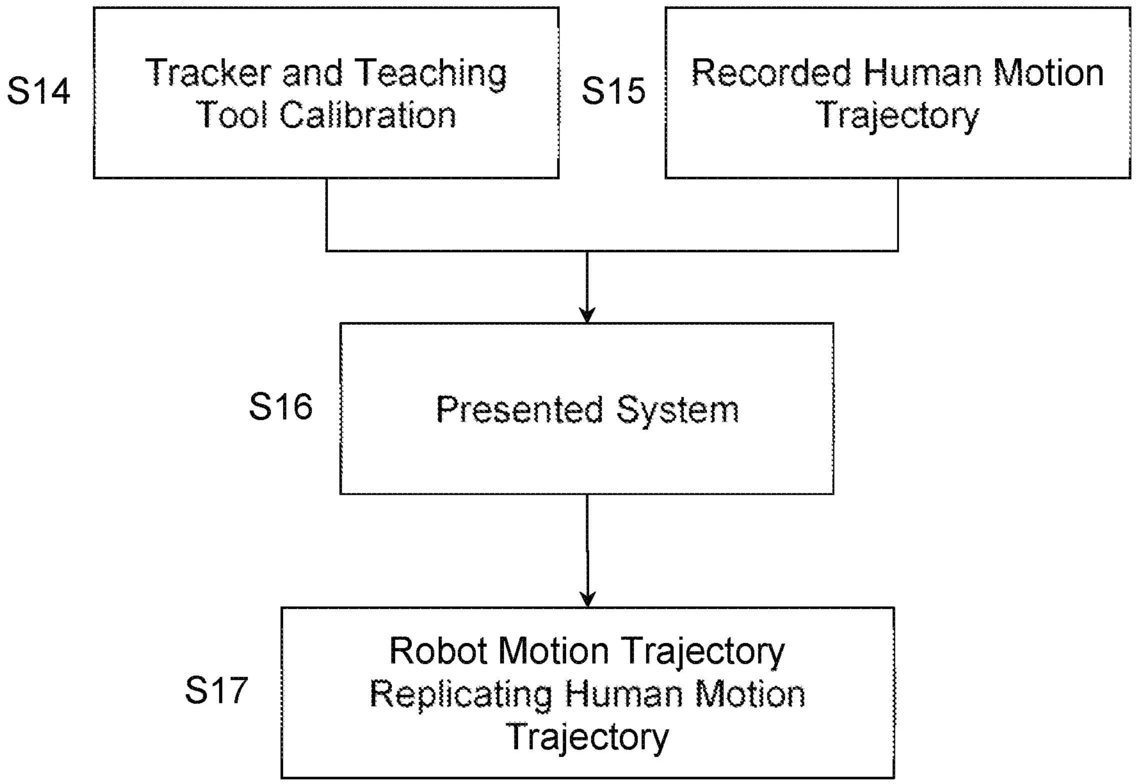
FIG. 8 is a process flow chart according to one aspect of the present invention.

FIG. 8 is a process flow chart according to one aspect of the present invention. At Step S14, the system of the present disclosure may measure and compute the relative positional and orientation transformation between the tracking device 9 and the end-effector 3 when the teaching tool 1 is being grasped, as described in Tracker Calibration Process (P1) and Teach Tool Calibration Process (P2), and shown in FIGS. 4 and 5, respectively. At Step S15, the system may record motion trajectory demonstrated by a human with respect to tracking device 9 as shown in FIG. 6. At Step S16, the system may transform the recorded motion trajectory of the tracking device 9 to the motion trajectory of the robot end-effector 3. In Step S17, the robot motion trajectory may be executed by the robot, which replicates the motion trajectory with respect to the teaching tool 9 demonstrated by the human.

In one aspect, the system of the present application employs the following methods to compute this transformation. As shown in FIGS. 1 and 2, the system may include a modular calibration tool including teaching tool placement platform 4, reference tracker placement platform 5, and a robot mount 6. Robot mount 6 may be coupled to the base of the robot arm 2 to obtain accurate position and orientation for teaching tool placement platform 4 and reference tracker placement platform 5. The calibration process may be described as two independent processes. The Tracker Calibration Process may include calibration of the position and orientation of the tracking device 9 and its physical relationship with, i.e., location on, the teaching tool 1. The Tracker Calibration Process may be performed in a non-robot environment, i.e., without the robot present, as shown in FIG. 1 to reduce noise introduced by the robot arm 2 when present. The Teach Tool Calibration Process may be performed with the robot present in the environment as shown in FIG. 2, and may not need output from the tracking device 9.

Figure 4:
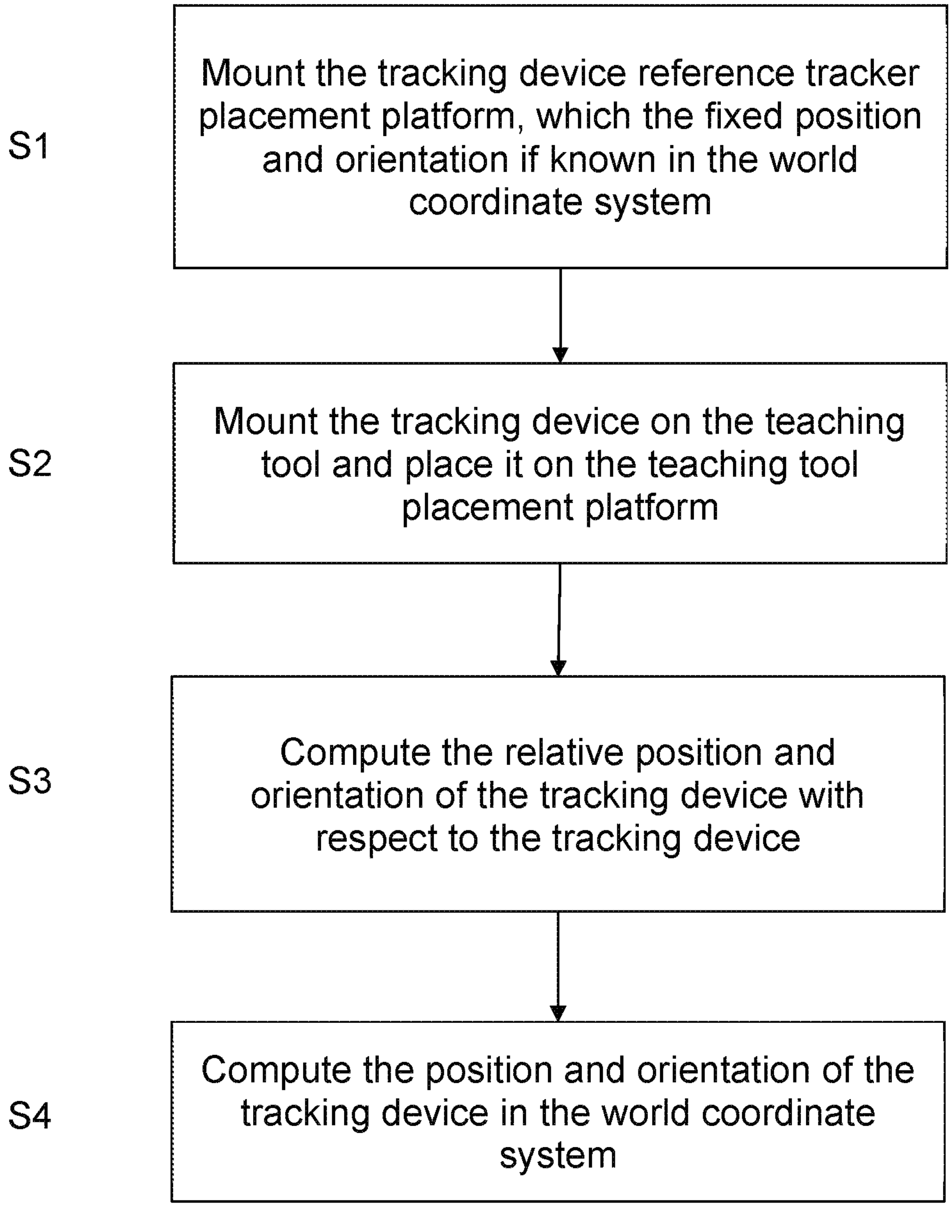
FIG. 4 is a flow chart explaining the calibration process for the tracking device 9 according to an aspect of the present disclosure.

In Tracker Calibration Process (P1) shown in FIG. 4, the goal is to calibrate the position and orientation of the tracking device 9 in the world coordinate system. To do so with high accuracy, it may be performed in a non-robot environment to reduce noise caused by the robot. The presence of a robot during this step may generate unacceptable noise levels, likely due to the materials of the robot, i.e., metal reflection, and electromagnetic interferences, i.e., interaction with signals and tracking sensors. Where the position and orientation of points on the calibration tools 4,5,6 with respect to the world coordinate system are known, two tracking devices 8 and 9 may be used. In Step S1, tracking device 8 may be used as a reference device and may be placed on the reference tracker placement platform 5. In Step S2, tracking device 9 may be used as a teaching device and may be mounted on the teaching tool 1 placed on teaching tool placement platform 4. In Step S3, the position and orientation of both tracking devices 8 and 9 may be obtained in the same coordinate system. As a result, the system may compute the relative position and orientation of the tracking device 9 with respect to the tracking device 8. Since the position and orientation of tracking device 8 in the world coordinate system is known, in Step S4, the system may compute the position and orientation of the tracking device 9 in the world coordinate system.

Figure 5:
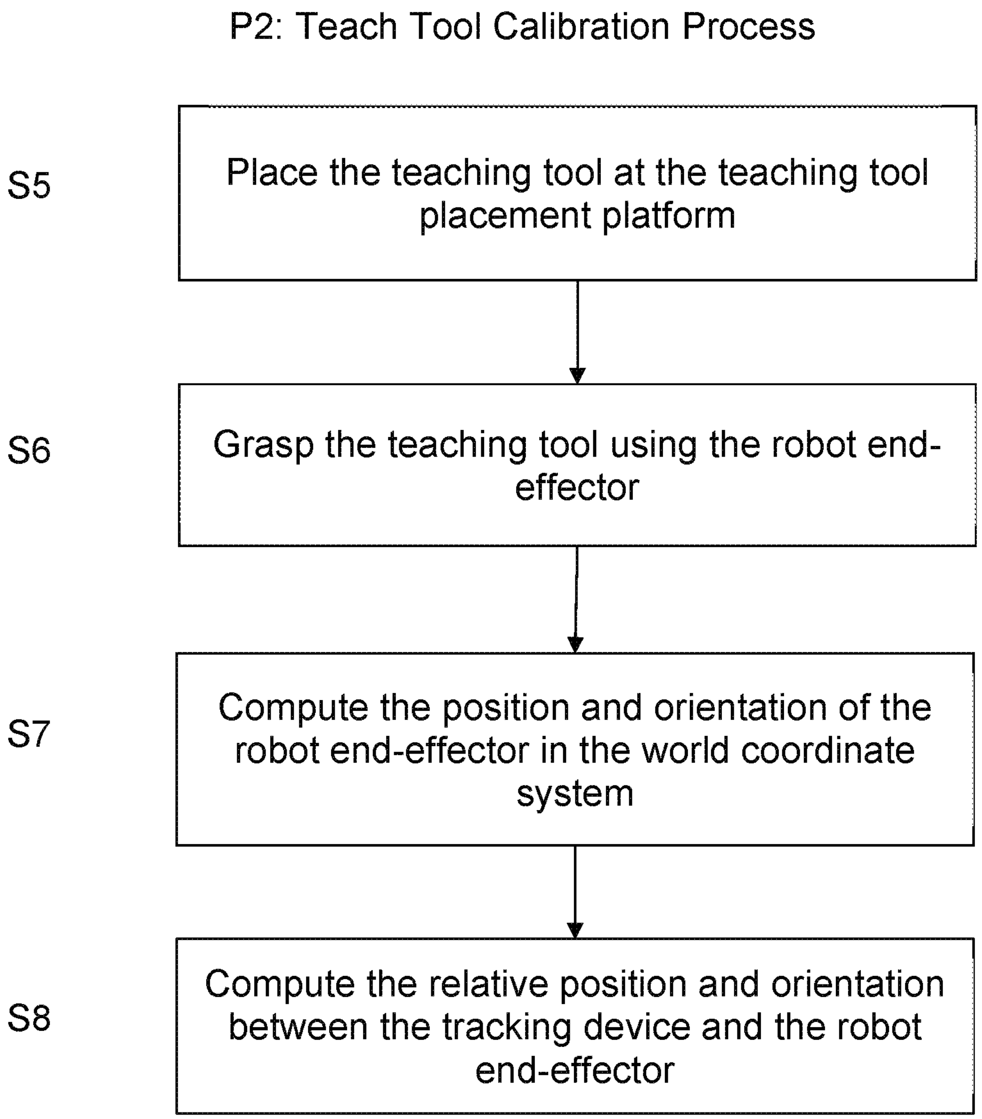
FIG. 5 is a flow chart explaining the calibration process for the teaching tool 1 according to an aspect of the present disclosure.
Figure 6:
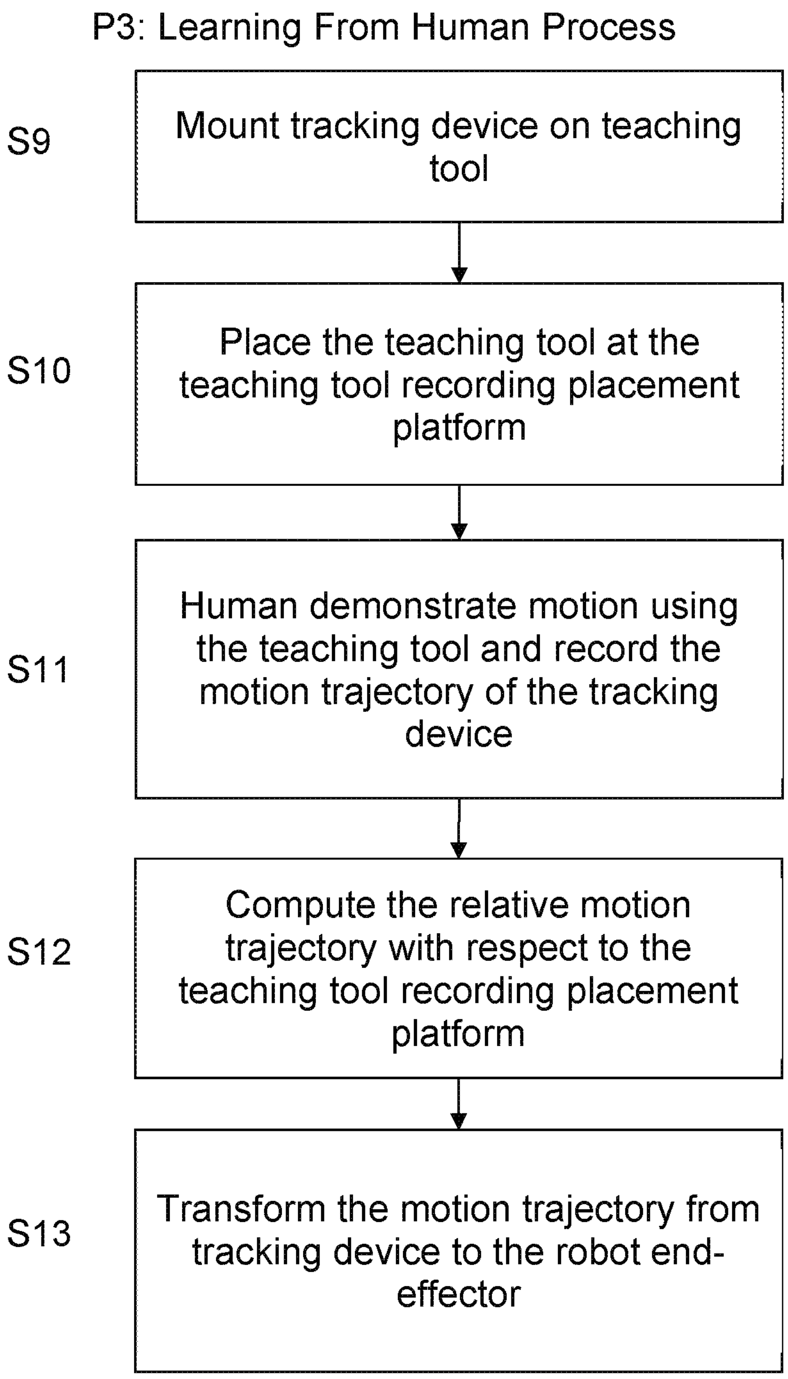
FIG. 6 is a flow chart showing human teaching and demonstration process according to an aspect of the present disclosure.

In Teach Tool Calibration Process (P2) shown in FIG. 5, the goal is to calibrate the position and orientation of the tracking device 9, which is coupled to the teaching tool 1, with respect to the end-effector 3 of the robot arm 2. In this process, the calibration is performed with the robot mount 6 mounted to the base of the robot arm 2, as shown in FIG. 2. In Step S5, the teaching tool 1 may be placed on teaching tool placement platform 4 in a position and orientation exactly the same as during Tracker Calibration Process Step S2 in FIG. 4. In Step S6, robot end effector 3 may be moved by a program or human to grasp the teaching tool 1 at grasping tool 15 attached thereto. Robot end effector 3 may be limited to grasp teaching tool 1 by the grasping tool 15 at the same relative position and orientation. For best accuracy, the teaching tool 1 must remain in the same position and orientation from Step S5 to S6. In Step S7, the position and orientation of the robot end-effector 3 in the world coordinate system may be calculated through forward kinematics. Given the determination of position and orientation of the tracking device 9 in the world coordinate system computed in Tracker Calibration Process (P1), in Step S8, the system can then obtain the relative position and orientation between the tracking device 9 and the robot end-effector 3 and/or grasping tool 15 of teaching tool 1.

Given the relative transformation between the tracking device 9 and the robot end-effector 3 when the teaching tool 1 is being grasped at grasping tool 15, the process to capture and reproduce precise human motions is described below. As shown in FIG. 3, to improve the accuracy of the recording system, a recording platform 12 may be used. The recording platform 12 may include a teaching tool recording placement platform 11 (also shown in FIG. 7), where the teaching tool 1 may be placed during the start and the end of the recording. Interaction tool placement platform 16 may store or hold tools for interaction. In one aspect of the invention of the present application, platform 16 may be a latte art platform where the cup 14 is placed. In other aspects, such as painting with a brush, platform 16 may hold or support a canvas.

In one aspect, either Tracker Calibration Process (P1) or Teach Tool Calibration Process (P2) may be performed first and once per teaching tool. Once those processes are completed, the system may proceed to Learning from Human Process (P3), shown in FIG. 6. In Learning from Human Process (P3), the system may record the motion trajectory captured using the tracking device 9 and transform it into a motion trajectory of the robot end-effector 3 where the trajectory of the teaching tool 1 remains the same. This process may be performed in the non-robot environment as in FIG. 3 to improve recording accuracy. The presence of a robot during this step may generate unacceptable noise levels, likely due to the materials of the robot, i.e., metal reflection, and electromagnetic interferences, i.e., interaction with signals and tracking sensors. In Step S9, the tracking device 9 may be mounted on the teaching tool 1 at the same location as during calibration. In Step S10, the teaching tool 1 is placed at teaching tool recording placement platform 11 where the position and orientation of the fixed location with respect to the world coordinate system is already known. In Step S11, the system may record a human 13 picking up the teaching tool 1 and demonstrating a motion trajectory to be learned by the robot. In Step S12, the system may transform the recorded motion trajectory of the tracking device 9 using the initial position and orientation determined in Step S10 as reference point, to obtain the motion trajectory of the tracking device 9 with respect to the world coordinate system. Using the calibration result from Teaching Tool Calibration Process P2, in Step S13, the motion trajectory of the tracking device 9 with respect to the world coordinate system can then be transformed into the motion trajectory of the robot end-effector 3 with respect to the world coordinate system.

Figure 7:
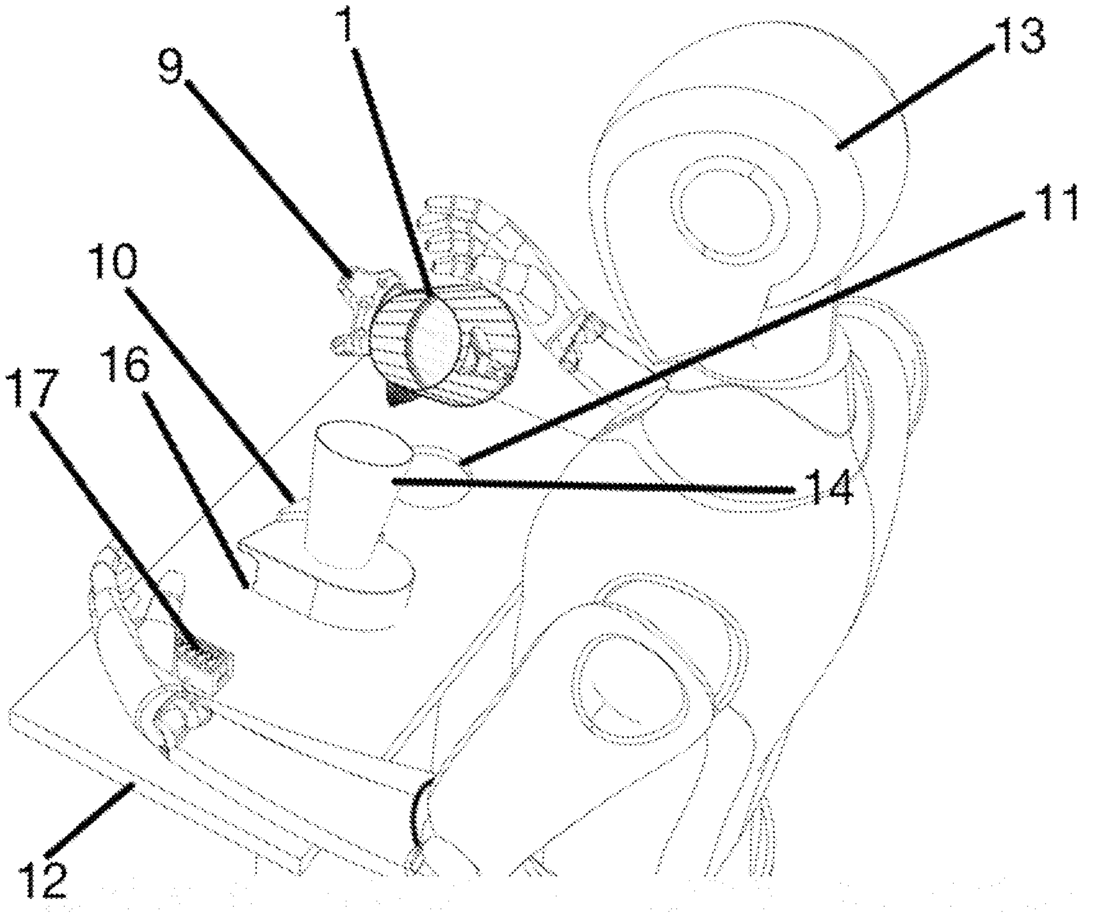
FIG. 7 is a schematic diagram of the system for teaching latte art with cup tilting enabled according to an aspect of the present disclosure.

The system may be used with other customized hardware to teach the robot to perform specific tasks. One such example is shown in FIG. 7. A movable platform, such as tilting platform 10, powered by a single or a set of motors may be used with the motion capture system to capture detailed human motion that acts in synchronicity with some other moving platform. One example application for such a teaching system is teaching a robot to perform latte art for automated coffee-making. To teach the robot to make complicated latte art, the system may use a tilting platform 10 so that a user can teach the robot to pour milk from a milk pitcher 1 into the cup 14 using various techniques. When creating latte art, during a pour, a human latte artist tilts the beverage container, such as cup 14, to change the relationship of the container and the liquid within the container to create art not otherwise possible when the container is not tilted. To teach the system these artistic techniques, tilting platform 10 may tilt in all directions and may be operated by controllers, motors or servos that encode position and control movement. In one non-limiting example, tilt amount, tilt direction, and tilt speed of the tilting platform 10 and cup 14 may be controlled by control switch 17 operated by the user. When teaching the system, a user may operate control switch 17 to change the orientation of tilting platform 10 and cup 14 in a manner similar to the way the user would tilt cup 14 when pouring by hand. In another aspect, a user may tilt the tilting platform 10 manually, i.e., without control switch 17, and the tilting platform 10 may encode the movements. Tilting platform 10 orientation information may be recorded at the same time as the human motion of holding milk pitcher 1 recorded by the motion capture system. During creation of latte art by the robot, tilting platform 10 may receive signals causing it to move in ways that mirror movements learned during Step S11.

Traditionally, such complex motion would require two robotic arms, one to hold the cup 14 and one to hold the milk pitcher 1. This invention allows a more cost effective system that achieves the same level of accuracy and synchronization between two moving platforms, i.e., the tilting platform 10 and the robotic arm 2.

As desired, embodiments of the disclosure may include systems with more or fewer components than are illustrated in the drawings. Additionally, certain components of the systems may be combined in various embodiments of the disclosure. The systems described above are provided by way of example only.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The invention claimed is:

1. A method for recording human motion performing a task with a tool and training a robot to perform the task, comprising the steps of:

a. performing tracker calibration without the robot present, comprising the steps of:
i. receiving a first location signal from a first tracking device at a known location;
ii. receiving a second location signal from a second tracking device in close proximity to the tool, where the tool is placed at a tool position and orientation at a tool location;
iii. computing a relative position of the second tracking device based on the first location signal, the second location signal; and
iv. computing a position and orientation of the second tracking device based on the relative position and the known location of the first tracking device;

b. performing teaching tool calibration with the robot present and placed at a predetermined location, comprising the steps of:
i. placing the tool at the tool position and orientation at the tool location;
ii. grasping a portion of the tool with an end-effector of the robot;
iii. computing a position and orientation of the end-effector based on forward kinematics; and
iv. computing a relative position and orientation difference between the end effector and the tool based on the position and orientation of the second tracking device and the position and orientation of the end-effector;

c. performing training without the robot present, comprising the steps of:
i. placing the tool, with a third tracking device affixed thereto, at a predetermined position and orientation;
ii. receiving location information from the third tracking device and recording a motion trajectory of the tool;
iii. transforming the recorded motion trajectory of the tool to a world coordinate system using the position and orientation of the tool; and
iv. transforming the recorded motion trajectory of the tool to a motion trajectory of the end-effector using the relative position and orientation difference.

2. The method of claim 1, where the second tracking device is the third tracking device.

3. The method of claim 1, wherein the motion trajectory of the tool is based on a human performing the task while handling the tool.

4. The method of claim 1, further comprising receiving and recording input from a human to move a platform capable of holding an open top liquid container.

* * * * *